(12) United States Patent
Teraoka

(10) Patent No.: US 10,310,235 B2
(45) Date of Patent: Jun. 4, 2019

(54) CAMERA LENS

(71) Applicant: AAC Technologies Pte. Ltd., Singapore (SG)

(72) Inventor: Hiroyuki Teraoka, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 0 days.

(21) Appl. No.: 15/915,449

(22) Filed: Mar. 8, 2018

(65) Prior Publication Data

US 2018/0267274 A1    Sep. 20, 2018

(51) Int. Cl.
*G02B 9/60* (2006.01)
*G02B 13/00* (2006.01)

(52) U.S. Cl.
CPC .......... *G02B 13/0045* (2013.01); *G02B 9/60* (2013.01)

(58) Field of Classification Search
CPC .............................. G02B 9/60; G02B 13/0045

USPC .................................. 359/714, 753, 763, 764
See application file for complete search history.

(56) References Cited

U.S. PATENT DOCUMENTS 9,638,837 B2 * 5/2017 Yonezawa ................ G02B 3/04

\* cited by examiner

*Primary Examiner* — William Choi
(74) *Attorney, Agent, or Firm* — Na Xu; IPro, PLLC

(57) ABSTRACT

The invention provides a camera lens composed of 5 lenses having excellent optical characteristics, narrow angle and small size. The camera lens has a first lens with a positive refractive power, a second lens with a negative refractive power, a third lens with a positive refractive power, a fourth lens with a negative refractive power and a fifth lens with a negative refractive power. The invention is particularly suitable for mobile phone camera lens assembly and WEB camera lens using camera element such as high pixel CCD, CMOS etc. At the same time, the camera lens consisting of five lenses with narrow angle, small size and excellent optical properties can be provided.

4 Claims, 4 Drawing Sheets

CAMERA LENS

FIELD OF THE PRESENT DISCLOSURE

The invention relates to a camera lens. In particular, the invention relates to mobile phone camera assembly, WEB camera lens, etc., which are suitable for using camera elements such as high-pixel CCD, CMOS and other; At the same time, the camera lens consists of five small sized lenses with narrow view angle below 50° (hereinafter referred to as 2ω) and excellent optical properties.

DESCRIPTION OF RELATED ART

In recent years, various kinds of camera devices which use the CCD, CMOS and other camera elements become widely popular. With the development of miniaturization and high performance of camera elements, the society needs a small camera lens with excellent optical properties and narrow angle.

The development of technology related to the camera lens consisting of five small lenses with excellent optical properties is in progress step by step. The proposed solution is that the camera lens consists of five lenses from the object side surface in turn as follows: the first lens with positive refractive power, the second lens with negative refractive power, the third lens with positive refractive power, the fourth lens with negative refractive power and the fifth lens with negative refractive power.

The camera lens of the correlation technique consists of the above five lenses. However, the refractive power distribution of the first lens, the ratio between the axial distance from the image side surface of the third lens to the object side surface of the fourth lens and the focal length of the whole camera lens, the shape of the first lens and the fourth lens are not sufficient. The camera lens in the correlation technology consists of the above five lenses. However, the refractive power distribution of the first lens, the ratio between the axial distance from the image side surface of the third lens to the object side surface of the fourth lens and the focal length of the whole camera lens, the shape of the first lens and the fourth lens are not sufficient, so it is 2ω≥75.8 wide angle. The camera lens of the related technique consists of the above five lenses, but the refractive power distribution of the first lens and the shape of the first lens and the fourth lens are not sufficient, so it is 2 ω≥64.0 wide angle.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
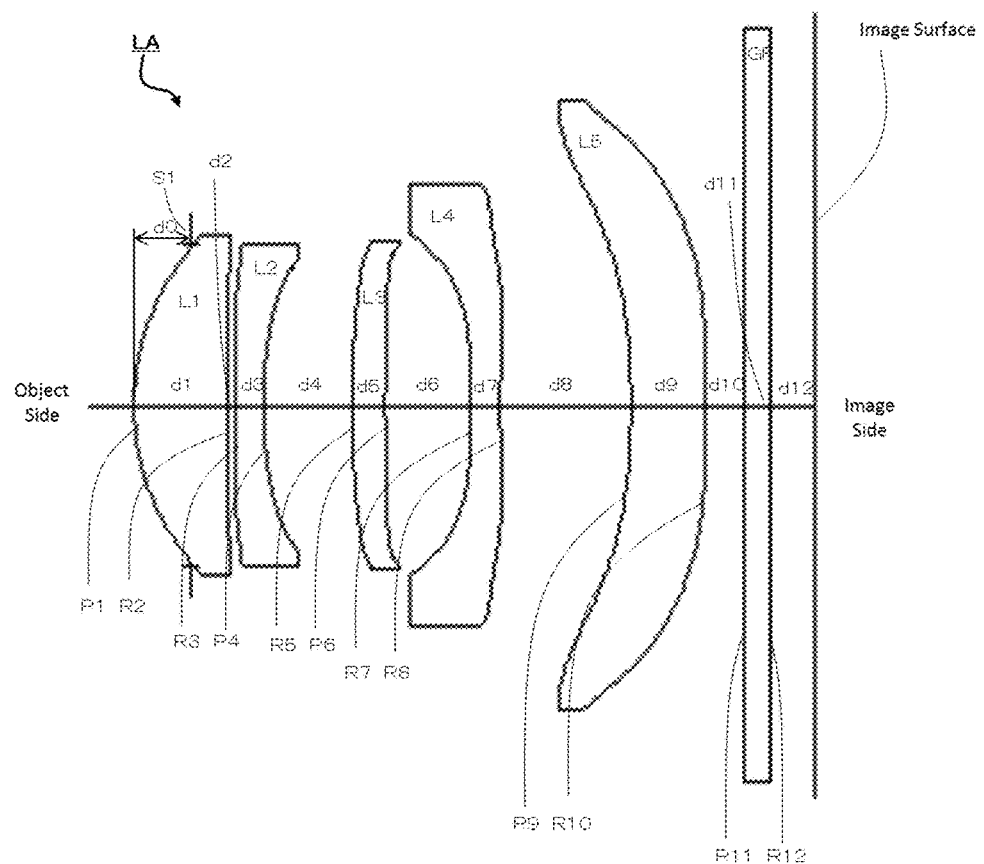
FIG. 1 is an illustrative structural view of a camera lens LA of the present invention.

An embodiment of a camera lens associated with the present invention is illustrated with reference to the drawings. FIG. 1 shows an illustrative structural view of a camera lens of an embodiment of the present invention. The camera lens LA consists of following five lenses which are arranged in turn from an object side to an image side: a first lens L1, a second lens L2, a third lens L3, a fourth lens L4, and a fifth lens L5. A glass plate GF is arranged between the fifth lens L5 and an image surface. The glass plat GF may use a glass sheet or a filter with an IR cut-off function. It is also fine if a glass plate is not provided between the fifth lens L5 and the image surface and image surface.

The first lens L1 has a positive refractive power, the second lens L2 has a negative refractive power, the third lens L3 has a positive refractive power, the fourth lens L4 has a negative refractive power, and the fifth lens L5 has a negative refractive power. In order to correct the aberration better, the surfaces of these five lenses should be better designed as aspherical surfaces.

The camera lens LA satisfies the following conditions (1)-(4):

$$0.40 \leq f1/f \leq 0.50 \tag{1}$$

$$0.08 \leq d6/f \leq 0.15 \tag{2}$$

$$-1.05 \leq (R1+R2)/(R1-R2) \leq -0.90 \tag{3}$$

$$0.30 \leq (R7+R8)/(R7-R8) \leq 3.00 \tag{4};$$

where f: The focal length of the whole camera lens;

f1: Focal length of the first lens;

d6: An axial distance from the image side surface of the third lens to the object side surface of the fourth lens;

R1: The curvature radius of the object side surface of the first lens;

R2: The curvature radius of the image side surface of the first lens;

R7: The curvature radius of the object side surface of the fourth lens;

R8: The curvature radius of the image side surface of the fourth lens.

The condition (1) specifies the positive refractive power of the first lens L1. It is difficult to develop toward narrow angle and miniaturization with excellent optical properties outside the scope of condition (1).

In this case, it is better to set the value range of the condition (1) within the range of the following condition (1-A):

$$0.44 \leq f1/f \leq 0.47 \tag{1-A}$$

The condition (2) specifies the ratio of the axial distance from the image side surface of the third lens L3 to the object side surface of the fourth lens L4 to the focal length f of the camera lens as a whole. It is difficult to develop toward narrow angle and miniaturization with excellent optical properties outside the range of condition (2).

In this case, it is better to set the value range of the condition (2) within the range of the following condition (2-A):

$$0.11 \leq d6/f \leq 0.13 \tag{2-A}$$

Condition (3) specifies the shape of the first lens L1. It is difficult to develop toward narrow angle and miniaturization with excellent optical properties outside the range of condition (3).

In this case, it is better to set the value range of the condition (3) within the range of the following condition (3-A):

$$-0.99 \leq (R1+R2)/(R1-R2) \leq -0.93 \tag{3-A}$$

The shape of the fourth lens L4 is defined by the condition (4). It is difficult to develop toward narrow angle and miniaturization with excellent optical properties outside the range of condition (4).

In this case, it is better to set the value range of the condition (4) within the range of the following condition (4-A):

$$0.70 \leq (R7+R8)/(R7-R8) \leq 2.00 \tag{4-A}$$

The second lens L2 has negative refractive power and meets the following condition (5):

$$0.50 \leq (R3+R4)/(R3-R4) \leq 1.20 \tag{5}$$

Of which,

R3: The curvature radius of the object side surface of the second lens;

R4: The curvature radius of the image side surface of the second lens.

Condition (5) defines the shape of the second lens L2. It is difficult to develop toward narrow angle and miniaturization with excellent optical properties outside the range of condition (5).

In this case, it is better to set the value range of condition (5) within the range of the following condition (5-A):

$$0.75 \leq (R3+R4)/(R3-R4) \leq 1.00 \tag{5-A}$$

The third lens L3 has positive refractive power and meets the following condition (6):

$$-15.00 \leq (R5+R6)/(R5-R6) \leq -0.10 \tag{6}$$

Of which,

R5: The curvature radius of the object side surface of the third lens;

R6: The curvature radius of the image side surface of the third lens.

Condition (6) defines the shape of the third lens L3. It is difficult to develop toward wide angle and miniaturization with excellent optical properties outside the range of condition (6).

In this case, it is better to set the value range of the condition (6) within the range of the following condition (6-A):

$$-8.00 \leq (R5+R6)/(R5-R6) \leq -2.00 \tag{6}$$

The fifth lens L5 has negative refractive power and meets the following condition (7).

$$-3.50 \leq (R9+R10)/(R9-R10) \leq -1.00 \tag{7}$$

where,

R9: The curvature radius of the object side surface of the fifth lens;

R10: The curvature radius of the image side surface of the fifth lens.

Condition (7) defines the shape of the fifth lens L5. It is difficult to develop toward wide angle and miniaturization with excellent optical properties outside the scope of condition (7).

In this case, it is better to set the value range of the condition (7) within the range of the following condition (7-A):

$$-2.00 \leq (R9+R10)/(R9-R10) \leq -1.10 \tag{7-A}$$

Since each of the five lenses of which the camera lens LA consists has the composition described above and meets the condition, it is possible to produce a camera lens with narrow angle, small size and excellent optical properties.

f: Focal length of the whole camera lens LA;
f1: Focal length of the first lens L1;
f2: The focal length of the second lens L2;
f3: Focal length of the third lens L3;
f4: Focal length of the fourth lens L4;
f5: Focal length of the fifth lens L5;
Fno: F value;
2ω: Field of view angle;
S1: Aperture;
R: Curvature radius of the optical surface and the center curvature radius of the lens;
R1: Curvature radius of the object side surface of the first lens L1;
R2: Curvature radius of the image side surface of the first lens L1;
R3: Curvature radius of the object side surface of the second lens L2;
R4: Curvature radius of the image side surface of the second lens L2;
R5: Curvature radius of the image side surface of the third lens L3;
R6: Curvature radius of the image side surface of the third lens L3;
R7: Curvature radius of the object side surface of the fourth lens L4;
R8: Curvature radius of the image side surface of the fourth lens L4;
R9: Curvature radius of the object side surface of the fifth lens L5;
R10: Curvature radius of the image side surface of the fifth lens L5;
R11: Curvature radius of the object side surface of glass plate GF;
R12: Curvature radius of the image side surface of glass plate GF;
d: Center thickness of a lens or the axial distance between lenses
d0: Axial distance from the open aperture S1 to the object side surface of the first lens L1
d1: Center thickness of the first lens L1 d2: Axial distance from the image side surface of the first lens L1 to the object side surface of the second lens L2.

d3: Center thickness of the second lens L2 d4: Axial distance from the image side surface of the second lens L2 to the object side surface of the third lens L3.

d5: Center thickness of the third lens L3 d6: Axial distance from the image side surface of the third lens L3 to the object side surface of the fourth lens L4.

d7: Center thickness of the fourth lens L4 d8: Axial distance from the image side surface of the fourth lens L4 to the object side surface of the fifth lens L5.

d9: Center thickness of the fifth lens L5 d10: Axial distance from the image side surface of the fifth lens L5 to the side of the glass plate GF d11: Center thickness of GF on Glass Plate d12: Axial distance from the image side surface of the glass plate GF to the image surface of the same.

nd: Refraction index of d line;

nd1: Refraction index of the d line of the first lens L1;

nd2: Refraction index of the d line of the second lens L2;

nd3: Refraction index of the d line of the third lens L3;

nd4: Refraction index of the d line of the fourth lens L4;

nd5: Refraction index of the d line of the fifth lens L5;

nd6: Refraction index of d line of glass plate GF;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: The Abbe number of GF on glass plate;

TTL: Optical length (total track length, an axial distance from the object side surface of the first lens L1 to the image surface of the same);

LB: The axial distance from the image side surface of the fifth lens L5 to the image surface of the same (including the thickness of the glass plate GF);

IH: Image height;

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (8)$$

Where R is the curvature radius on the axis and k is the cone coefficient A4, A6, A8, A10, A12, and A14 and A16 are aspherical coefficients.

For convenience, The aspherical surface of each lens surface uses the aspherical surface shown in condition (8). However, the present invention is not limited to the aspheric polynomial form represented by the condition (8).

Embodiment 1

Figure 2:
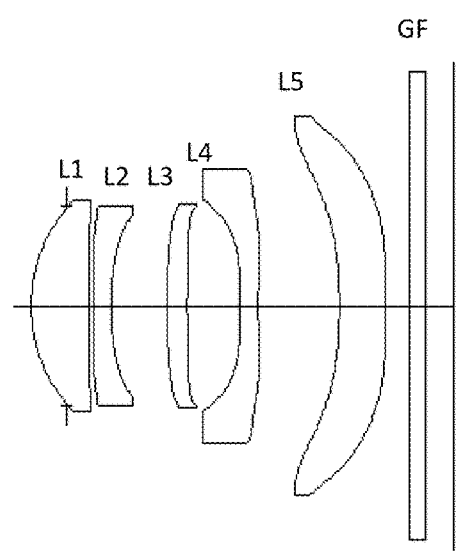
FIG. 2 is an illustrative structural view of a camera lens LA in accordance with a first embodiment of the present invention.

FIG. 2 shows a camera lens LA of a first embodiment. The data of the camera lens LA in Embodiment 1 are shown in Table 1 and Table 2.

TABLE 1

|  | R | d |  | nd |  | vd |
|---|---|---|---|---|---|---|
| S1 | ∞ | d0= | −0.450 |  |  |  |
| R1 | 1.46909 | d1= | 0.724 | nd1 | 1.5439 v1 | 55.95 |
| R2 | −97.87351 | d2= | 0.066 |  |  |  |
| R3 | −54.22629 | d3= | 0.220 | nd2 | 1.6614 v2 | 20.41 |
| R4 | 2.88111 | d4= | 0.692 |  |  |  |
| R5 | 4.96792 | d5= | 0.264 | nd3 | 1.6614 v3 | 20.41 |
| R6 | 9.93591 | d6= | 0.664 |  |  |  |
| R7 | 3142.98484 | d7= | 0.232 | nd4 | 1.5352 v4 | 56.12 |
| R8 | 4.10777 | d8= | 1.026 |  |  |  |
| R9 | −5.22644 | d9= | 0.587 | nd5 | 1.5439 v5 | 55.95 |
| R10 | −25.84008 | d10= | 0.300 |  |  |  |
| R11 | ∞ | d11= | 0.210 | nd6 | 1.5168 v6 | 64.17 |
| R12 | ∞ | d12= | 0.335 |  |  |  |

TABLE 2

|  | Conic Coefficient | Aspherical Coefficient | | | | | | |
|---|---|---|---|---|---|---|---|---|
|  | k | A4 | A6 | A8 | A10 | A12 | A14 | A16 |
| R1 | −8.6735E−03 | −1.2323E−02 | 1.7536E−02 | −2.4178E−02 | 2.0821E−02 | −3.6587E−03 | −2.0911E−03 | −1.1989E−03 |
| R2 | 0.0000E+00 | 2.4401E−02 | 3.0419E−03 | 3.2671E−02 | −1.4410E−02 | −1.2145E−02 | −2.0625E−02 | 1.6008E−02 |
| R3 | 0.0000E+00 | 4.3728E−02 | 1.1274E−02 | 1.3265E−02 | −1.0678E−02 | −1.0656E−02 | −9.7015E−03 | 1.2257E−02 |
| R4 | 5.7602E+00 | −1.0598E−04 | 5.9892E−02 | −3.5660E−02 | −7.2355E−02 | 5.6554E−02 | 1.2063E−01 | −9.0166E−02 |
| R5 | −1.1993E+01 | −1.9557E−02 | −2.2789E−03 | 1.6300E−03 | 2.1511E−02 | 1.7155E−02 | 1.2232E−02 | −1.8655E−02 |
| R6 | −1.2941E+02 | −3.3575E−02 | 2.3319E−02 | −5.0653E−02 | 5.5157E−02 | 4.6685E−02 | −3.5530E−02 | 5.0137E−03 |
| R7 | −2.8714E+08 | −2.9209E−01 | 1.7166E−02 | 9.3567E−03 | −1.1947E−02 | 4.3915E−02 | −1.7831E−02 | −7.3727E−03 |
| R8 | −3.1272E+01 | −1.7418E−01 | 4.2926E−02 | 2.0269E−02 | 1.8280E−03 | −7.3373E−03 | 1.8159E−03 | −1.8007E−04 |
| R9 | 4.0691E+00 | −5.4363E−02 | 1.5829E−02 | −1.4295E−03 | −5.2179E−04 | 1.9064E−04 | 5.3442E−05 | −1.5122E−05 |
| R10 | −7.2665E+02 | −8.6713E−02 | 2.1476E−02 | −5.2977E−03 | 8.5595E−04 | −8.9084E−06 | −5.5188E−05 | 9.4280E−06 |

Table 5, which appears later, shows the values of embodiments 1-2 and the values corresponding to the specified parameters in the conditions (1)-(7).

As shown in table 5, Embodiment 1 meets the conditions (1)-(7).

Figure 3:
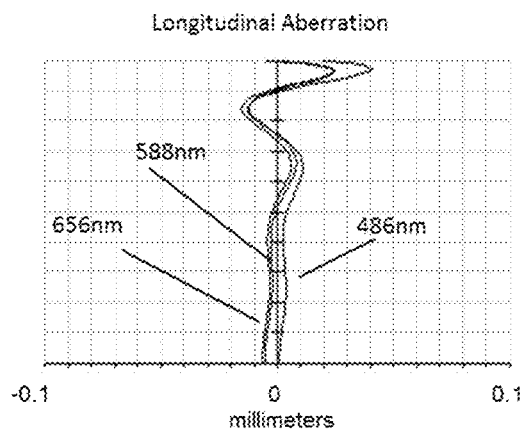
FIG. 3 shows the longitudinal aberration of the camera lens LA of the first embodiment.
Figure 4:
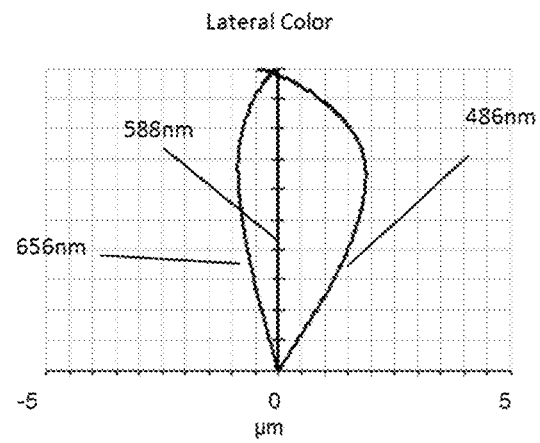
FIG. 4 shows the lateral color of the camera lens LA of the first embodiment.
Figure 5:
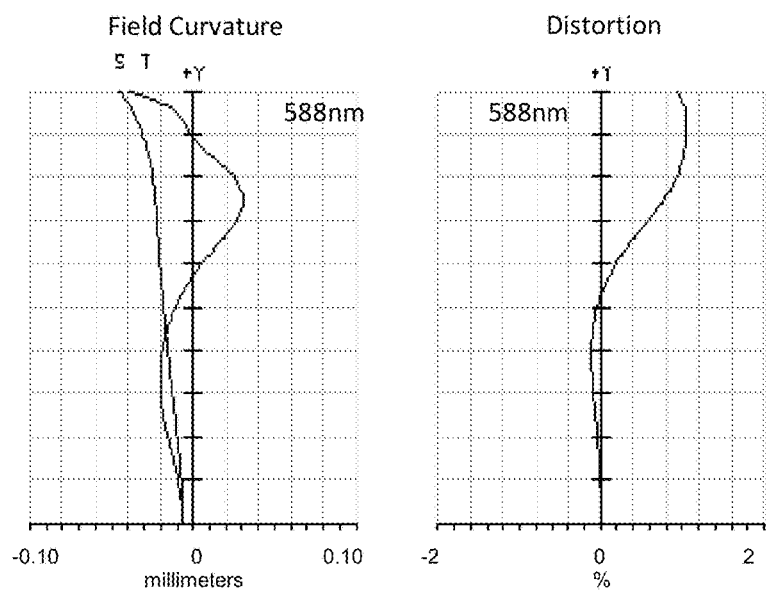
FIG. 5 shows the field curvature and distortion of the camera lens LA in the first embodiment.

The longitudinal aberration of the camera lens LA in Embodiment 1 is shown in FIG. 3, the lateral color is shown in FIG. 4, and the field curvature and distortion are shown in FIG. 5. In addition, in FIG. 5, the field curvature S is the field curvature opposite to the sagittal image surface, T is the field curvature opposite to the tangent image surface. The same applies in Embodiment 2. As shown in FIG. 3-5, in Embodiment 1, the camera lens LA is Fno=2.70, 2ω=47.8°, TTL=5.320 mm narrow angled, and small sized, so it is not difficult to understand that the camera lens has excellent optical properties.

Embodiment 2

Figure 6:
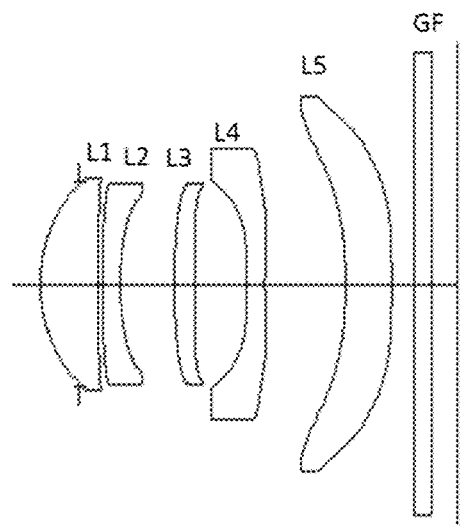
FIG. 6 is an illustrative structural view of a camera lens LA in accordance with a second embodiment of the invention.

FIG. 6 shows a the camera lens LA of Embodiment 2. The data of camera lens LA in Embodiment 2 are shown in Tables 3-4.

TABLE 3

|  | R |  | d | nd |  | vd |  |
|---|---|---|---|---|---|---|---|
| S1 | ∞ | d0= | −0.500 |  |  |  |  |
| R1 | 1.46993 | d1= | 0.737 | nd1 | 1.5439 | v1 | 55.95 |
| R2 | −98.45632 | d2= | 0.063 |  |  |  |  |
| R3 | −57.96307 | d3= | 0.223 | nd2 | 1.6614 | v2 | 20.41 |
| R4 | 2.87393 | d4= | 0.689 |  |  |  |  |
| R5 | 4.98697 | d5= | 0.259 | nd3 | 1.6614 | v3 | 20.41 |
| R6 | 9.79851 | d6= | 0.665 |  |  |  |  |
| R7 | −900.89018 | d7= | 0.233 | nd4 | 1.5352 | v4 | 56.12 |
| R8 | 4.19130 | d8= | 1.027 |  |  |  |  |
| R9 | −5.22271 | d9= | 0.588 | nd5 | 1.5439 | v5 | 55.95 |
| R10 | −27.56097 | d10= | 0.300 |  |  |  |  |
| R11 | ∞ | d11= | 0.210 | nd6 | 1.5168 | v6 | 64.17 |
| R12 | ∞ | d12= | 0.326 |  |  |  |  |

TABLE 4

|  | Conic Coefficient | Aspherical Coefficient | | | | | | |
|---|---|---|---|---|---|---|---|---|
|  | k | A4 | A6 | A8 | A10 | A12 | A14 | A16 |
| R1 | −1.1436E−02 | −1.3163E−02 | 1.7579E−02 | −2.3871E−02 | 2.1109E−02 | −3.4973E−03 | −2.0513E−03 | −1.2363E−03 |
| R2 | 0.0000E+00 | 2.4519E−02 | 3.4330E−03 | 3.3228E−02 | −1.3965E−02 | −1.1899E−02 | −2.0540E−02 | 1.5998E−02 |
| R3 | 0.0000E+00 | 4.4119E−02 | 1.1270E−02 | 1.3162E−02 | −1.0580E−02 | −1.0368E−02 | −9.3558E−03 | 1.2552E−02 |
| R4 | 5.8105E+00 | −8.3275E−04 | 6.0402E−02 | −3.5153E−02 | −7.2855E−02 | 5.5462E−02 | 1.2050E−01 | −8.7796E−02 |
| R5 | −1.2778E+01 | −1.9899E−02 | −1.8830E−03 | 2.2533E−03 | 2.2205E−02 | 1.7718E−02 | 1.2573E−02 | −1.8640E−02 |
| R6 | −1.3434E+02 | −3.4070E−02 | 2.2900E−02 | −5.0328E−02 | 5.5876E−02 | 4.7270E−02 | −3.5290E−02 | 4.9808E−03 |
| R7 | −7.9830E+07 | −2.9120E−01 | 1.7590E−02 | 9.4376E−03 | −1.2225E−02 | 4.3408E−02 | −1.8149E−02 | −7.3863E−03 |
| R8 | −3.1306E+01 | −1.7406E−01 | 4.2946E−02 | 2.0257E−02 | 1.8057E−03 | −7.3572E−03 | 1.8129E−03 | −1.7198E−04 |
| R9 | 4.0844E+00 | −5.4373E−02 | 1.5824E−02 | −1.4311E−03 | −5.2212E−04 | 1.9064E−04 | 5.3495E−05 | −1.5082E−05 |
| R10 | −7.5524E+02 | −8.6772E−02 | 2.1463E−02 | −5.2992E−03 | 8.5587E−04 | −8.9638E−06 | −5.5190E−05 | 9.4257E−06 |

As shown in table 5, Embodiment 2 meets the conditions (1)-(7).

Figures 7, 8:
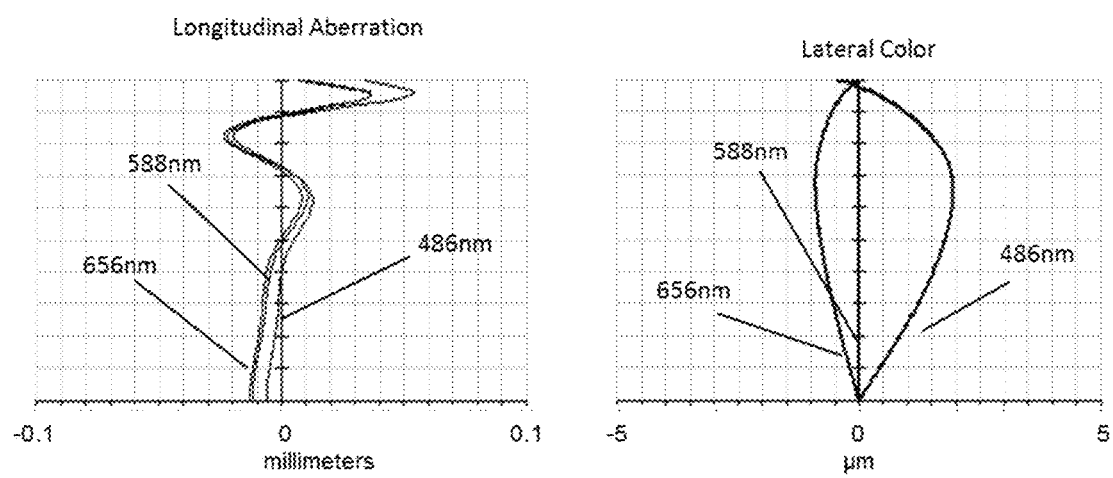
FIG. 7 shows the longitudinal aberration of the camera lens LA of the second embodiment.
FIG. 8 shows the lateral color of the camera lens LA of the second embodiment.
Figure 9:
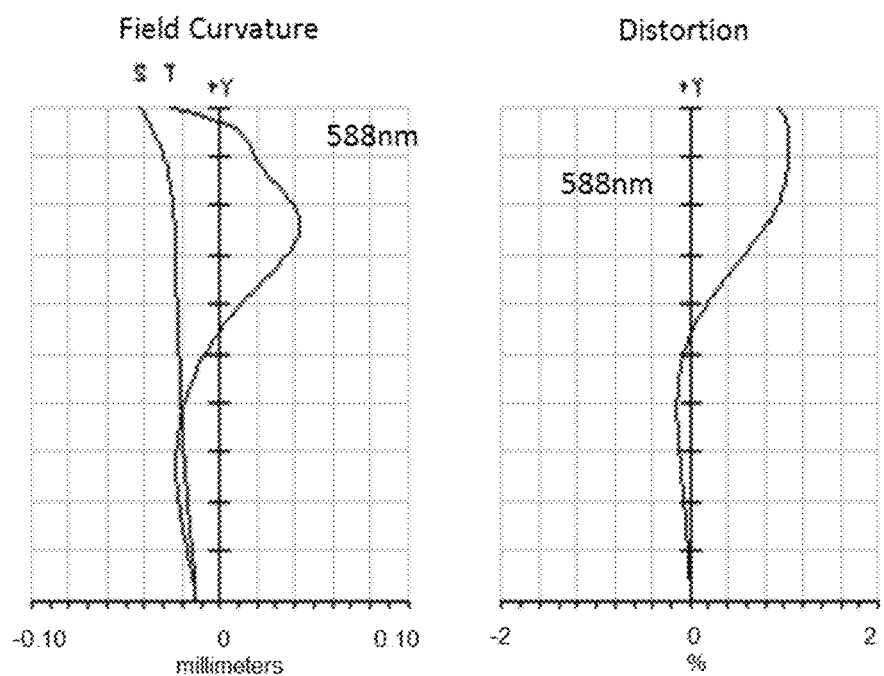
FIG. 9 shows the field curvature and distortion of the camera lens LA of the second embodiment.

The longitudinal aberration of the camera lens LA in Embodiment 2 is shown in FIG. 7, the lateral color is shown in FIG. 8, and the field curvature and distortion are shown in FIG. 9. As shown in FIG. 7-9, the camera lens LA in Embodiment 2 is Fno=2.60, 2ω=47.8°, TTL=5.320 mm narrow angled, and small, which makes it easy to understand why it has excellent optical properties.

Table 5 shows the values of the examples and the values corresponding to the specified parameters in the conditions (1)-(7). In addition, the various numerical units shown in Table 5 are 2 ω (°), f (mm), f1 (mm), f2 (mm), f3 (mm), f4 (mm), f5 (mm), TTL (mm), LB (mm), IH (mm).

TABLE 5

|  | Embodiment 1 | Embodiment 2 | Condition |
|---|---|---|---|
| f1/f | 0.451 | 0.452 | Condition (1) |
| d6/f | 0.112 | 0.113 | Condition (2) |
| (R1 + R2)/(R1 − R2) | −0.970 | −0.971 | Condition (3) |
| (R7 + R8)/(R7 − R8) | 1.003 | 0.991 | Condition (4) |
| (R3 + R4)/(R3 − R4) | 0.899 | 0.906 | Condition (5) |
| (R5 + R6)/(R5 − R6) | −3.000 | −3.073 | Condition (6) |
| (R9 + R10)/(R9 − R10) | −1.507 | −1.468 | Condition (7) |
| Fno | 2.70 | 2.60 |  |
| 2ω | 47.8 | 47.8 |  |
| f | 5.915 | 5.903 |  |
| f1 | 2.668 | 2.670 |  |
| f2 | −4.130 | −4.134 |  |
| f3 | 14.712 | 15.034 |  |
| f4 | −7.686 | −7.794 |  |
| f5 | −12.168 | −11.958 |  |
| TTL | 5.320 | 5.320 |  |
| LB | 0.845 | 0.836 |  |
| IH | 2.652 | 2.652 |  |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens, including arranged in a sequence from an object side to an image side: a first lens with a positive refractive power, a second lens with a negative refractive power, a third lens with a positive refractive power, a fourth lens with a negative refractive power and a fifth lens with a negative refractive power; wherein the camera lens further satisfies the following conditions (1)~(4):

$$0.40 \leq f1/f \leq 0.50 \quad (1)$$

$$0.08 \leq d6/f \leq 0.15 \quad (2)$$

$$-1.05 \leq (R1+R2)/(R1-R2) \leq -0.90 \quad (3)$$

$$0.30 \leq (R7+R8)/(R7-R8) \leq 3.00 \quad (4)$$

where,
f: Focal length of the whole camera lens;
f1: Focal length of the first lens;
d6: Axial distance from the image side surface of the third lens to the object side surface of the fourth lens;
R1: Curvature radius of the object side surface of the first lens;
R2: Curvature radius of the image side surface of the first lens;
R7: Curvature radius of the object side surface of the fourth lens;
R8: Curvature radius of the image side surface of the fourth lens.

2. The camera lens as described in claim 1 further satisfying following condition (5):

$$0.50 \leq (R3+R4)/(R3-R4) \leq 1.20 \quad (5)$$

where,
R3: Curvature radius of the object side surface of the second lens;
R4: Curvature radius of the image side surface of the second lens.

3. The camera lens as described in claim 1 further satisfying following condition (6):

$$-15.00 \leq (R5+R6)/(R5-R6) \leq -0.10 \quad (6)$$

where,
  R5: Curvature radius of the object side surface of the third lens;
  R6: Curvature radius of the image side surface of the third lens.

4. The camera lens as described in claim 1 further satisfying following condition (7):

$$-3.50 \leq (R9+R10)/(R9-R10) \leq -1.00 \quad (7)$$

where,
  R9: Curvature radius of the object side surface of the fifth lens;
  R10: Curvature radius of the image side surface of the fifth lens.

* * * * *